US008583884B2

(12) United States Patent
Sekine et al.

(10) Patent No.: US 8,583,884 B2
(45) Date of Patent: Nov. 12, 2013

(54) COMPUTING SYSTEM AND BACKUP METHOD

(75) Inventors: Kenji Sekine, Odawara (JP); Tomoyuki Kato, Odawara (JP); Kazuhide Sano, Fujinomiya (JP)

(73) Assignee: Hitachi, Ltd., Tokyo (JP)

( * ) Notice: Subject to any disclaimer, the term of this patent is extended or adjusted under 35 U.S.C. 154(b) by 202 days.

(21) Appl. No.: 12/596,242

(22) PCT Filed: Apr. 23, 2009

(86) PCT No.: PCT/JP2009/058534
§ 371 (c)(1),
(2), (4) Date: Oct. 16, 2009

(87) PCT Pub. No.: WO2010/122675
PCT Pub. Date: Oct. 28, 2010

(65) Prior Publication Data
US 2011/0167233 A1 Jul. 7, 2011

(51) Int. Cl.
*G06F 12/00* (2006.01)
*G06F 13/00* (2006.01)
*G06F 13/28* (2006.01)

(52) U.S. Cl.
USPC .......................................................... 711/162

(58) Field of Classification Search
USPC ................ 711/1, 154, 165, 203; 707/999.204
See application file for complete search history.

(56) References Cited

U.S. PATENT DOCUMENTS

| 6,457,109 B1 * | 9/2002 | Milillo et al. ................. 711/162 |
| 2007/0050574 A1 | 3/2007 | Kaiya et al. |
| 2008/0229038 A1 | 9/2008 | Kimura et al. |

FOREIGN PATENT DOCUMENTS

| JP | 2007-66162 A | 3/2007 |
| JP | 2008-234030 A | 10/2008 |

* cited by examiner

*Primary Examiner* — Christian P Chace
*Assistant Examiner* — Gary W Cygiel
(74) *Attorney, Agent, or Firm* — Mattingly & Malur, PC

(57) ABSTRACT

This invention proposes a computing system and a backup method capable of improving the backup efficiency. In accordance with copy requests from the host, the data written to the first logical volume in the first storage system is copied to the second logical volume in the first storage system, the data copied to the second logical volume is used to form a journal and is transferred to the second storage system asynchronously, with the writing of data from the host to the first logical volume. In the second storage system, the data transferred from the first storage system is written to the third logical volume in the second storage system.

8 Claims, 17 Drawing Sheets

FIG.5

| REQUEST # | SO-VOL# | COPY RANGE STARTING POSITION | COPY RANGE ENDING POSITION | TA-VOL# | FLAG | DIFFERENCE BITMAP |
|---|---|---|---|---|---|---|
| 0 | 0000 | 00000000 | 00010000 | 0010 | 0 | 0100111001······ |
| 1 | 0001 | 00010000 | 00020000 | 0011 | 1 | 1100011001······ |
| ... | ... | ... | ... | ... | ... | ... |
| 52A | 52B | 52C | 52D | 52E | 52F | 52G |

| PAIR # | SO-VOL# | TA-VOL# | FC PAIR STATUS |
|--------|---------|---------|----------------|
| 0 | 0000 | 0010 | Pair |
| 1 | 0001 | 0011 | Pair |
| ⋮ | ⋮ | ⋮ | ⋮ |
| 53A | 53B | 53C | 53D |

| PAIR # | P-VOL# | S-VOL# | UR PAIR STATUS | FC LINKAGE FLAG | FC DIFFERENCE BMP # | UR DIFFERENCE BMP # | PRIMARY JVOL # | SECONDARY JVOL # |
|---|---|---|---|---|---|---|---|---|
| 10 | 0010 | 2010 | Duplex | 1 | 0 | 0 | 1100 | 2100 |
| 11 | 0011 | 2011 | Duplex pending | 0 | 1 | 1 | 1100 | 2100 |
| ... | ... | ... | ... | ... | ... | ... | ... | ... |
| 54A | 54B | 54C | 54D | 54E | 54F | 54G | 54H | 54I |

| PAIR # | P-VOL# | S-VOL# | PRIMARY JVOL1 # | SECONDARY JVOL2 # | UR PAIR STATUS |
|--------|--------|--------|-----------------|-------------------|----------------|
| 10 | 0010 | 2010 | 1100 | 2100 | Duplex |
| 11 | 0011 | 2011 | 1100 | 2100 | Duplex pending |
| ⋮ | ⋮ | ⋮ | ⋮ | ⋮ | ⋮ |
| 70A | 70B | 70C | 70D | 70E | 70F |

71

COMPUTING SYSTEM AND BACKUP METHOD

TECHNICAL FIELD

This invention relates to a computing system and a backup method that is particularly suitable for application to a computing system performing backup using the in-storage copy function and the remote copy function.

BACKGROUND ART

Conventionally, as a backup function provided in a storage system, a copy function of creating mirrors of logical volumes in the same storage system without passing through the host (hereinafter referred to as the "in-storage copy function") exists.

Meanwhile, as another backup function installed in the storage system, a copy function of creating mirrors of logical volumes between two storage systems (hereinafter referred to as the "remote copy function") is also well known.

As methods for remote copy using the remote copy function, the synchronous method by which remote copy to logical volumes as the backup destination is performed for the relevant data in synchronization with the data written to the logical volumes and the asynchronous method by which remote copy to logical volumes as the backup destination is performed for data asynchronously with the data written to the logical volumes as the backup target exist.

By the synchronous method, after the data written to the logical volumes is copied to the logical volumes as the backup destination, a remote copy completion report is sent to the host. Therefore, the synchronous method has a problem in that, though backup is highly reliable, if the distance between the two storage systems is great, remote copy takes a fair amount of time, which deteriorates the copy efficiency.

Meanwhile, the asynchronous method issues the remote copy completion report to the host when the data has been written to the logical volumes, and then remote copy is performed for the relevant data at the convenience of the storage systems of the copy source and the copy destination. Therefore, the asynchronous method has a problem in that, though copy can be performed efficiently even if the distance between the two storage systems is great, backup has lower reliability.

DISCLOSURE OF THE INVENTION

Meanwhile, recently, the backup method linking the above-mentioned in-storage copy function and the synchronous remote copy function has been proposed. By the above-mentioned backup method, the data written to the first logical volume in the first storage system is copied to the second logical volume in the relevant first storage system and, for the data copied to the relevant second logical volume, remote copy to the third logical volume in the other storage system is performed by the synchronous method.

However, the above-mentioned backup method has a problem in that, as the distance between the first and the second storage systems becomes greater, more time is required for remote copy, which deteriorates the backup efficiency.

This invention was devised in view of the above. Thus, an object of this invention is to provide a computing system and a backup method capable of improving the backup efficiency.

In order to achieve the foregoing object, the present invention provides a computing system comprising a first storage system and a second storage system and which backs up data written from a host into a first logical volume in the first storage system to a third logical volume in the second storage system. With this computing system, the first storage system comprises a first copy monitoring/control unit for copying data written into the first logical volume in the first storage system to a second logical volume in the first storage system according to a copy request from the host, and a second copy monitoring/control unit for transferring to the second storage system the data, which was copied to the second logical volume, asynchronously with the writing of data from the host into the first logical volume. In addition, the second storage system comprises a third copy monitoring/control unit for writing the data which was transferred from the first storage system into the third logical volume.

The present invention additionally provides a backup method in a computing system comprising a first storage system and a second storage system and which backs up data written from a host into a first logical volume in the first storage system to a third logical volume in the second storage system. This backup method comprises a first step of copying data written into the first logical volume in the first storage system to a second logical volume in the first storage system according to a copy request from the host, a second step of transferring to the second storage system the data, which was copied to the second logical volume, asynchronously with the writing of data from the host into the first logical volume, and a third step of writing the data which was transferred from the first storage system into the third logical volume.

According to this invention, as remote copy between the first and the second storage systems is performed by the asynchronous method, even if the distance between the first and the second storage systems is great, remote copy can be performed efficiently. Therefore, the computing system and the backup method capable of improving the backup efficiency can be achieved.

BRIEF DESCRIPTION OF THE DRAWINGS

FIG. 5 is a conceptual diagram showing an FC request management table conceptually;

FIG. 6 is a conceptual diagram showing an FC pair management table conceptually;

FIG. 8 is a conceptual diagram showing a primary UR pair management table conceptually;

FIG. 10 is a conceptual diagram showing a secondary UR pair management table conceptually;

BEST MODE FOR CARRYING OUT THE INVENTION

An embodiment of this invention is described below with reference to the attached drawings.

(1) Hardware Configuration of Computing System According to this Embodiment

Figure 1:
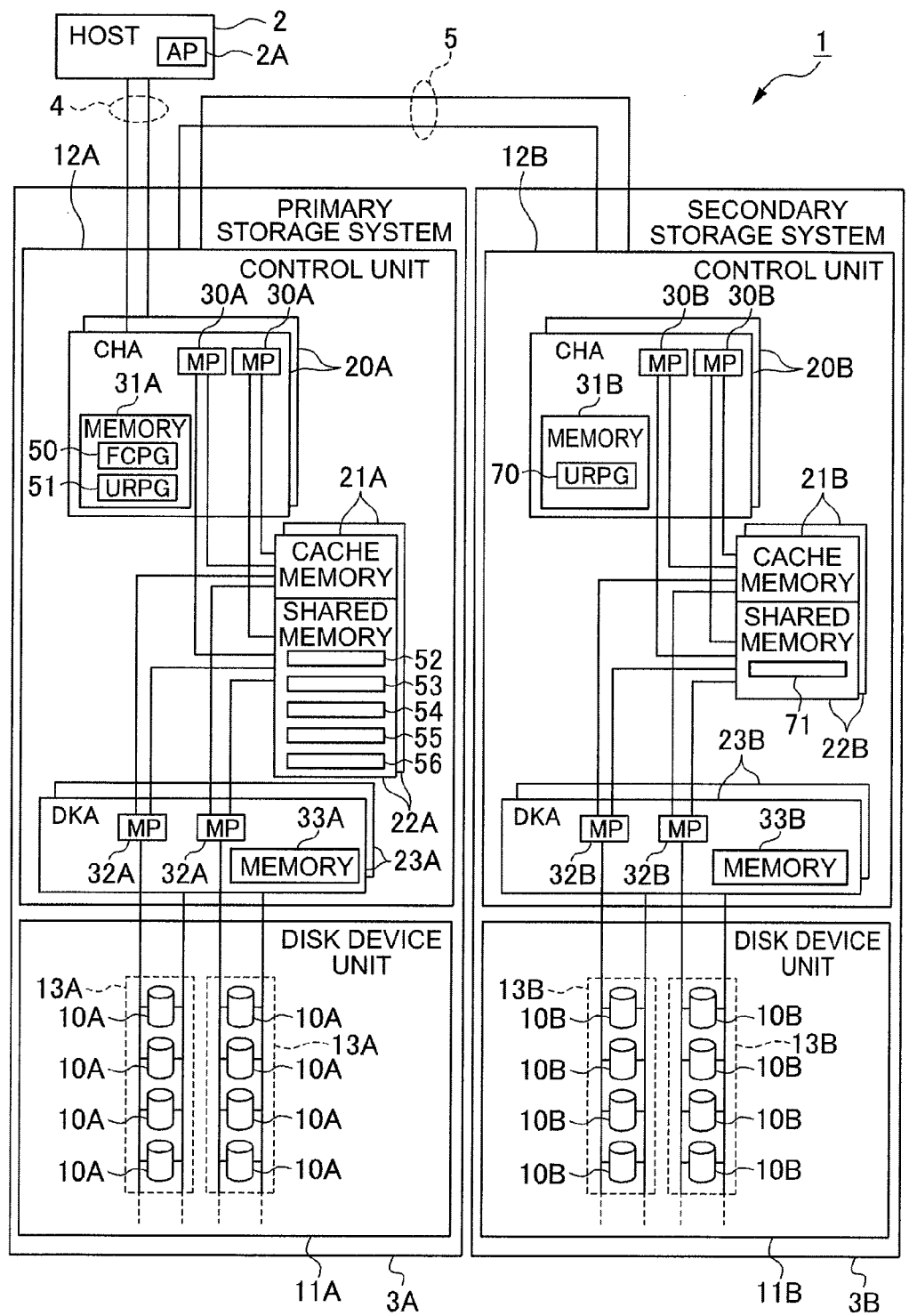
FIG. 1 is a block diagram showing the entire configuration of the computing system according to this embodiment.

FIG. 1 shows the overall computing system 1 according to this embodiment. The computing system 1 comprises a host 2, a primary storage system 3A, and a secondary storage system 3B.

The host 2 is a computer device comprising information processing resources such as a CPU (Central Processing Unit) and memories, and is configured of, for example, a personal computer, a work station, a mainframe, or others. The host 2 is installed in the same first site as the primary storage system 3A and connected to the primary storage system 3A via a communication path 4 such as cables, SAN (Storage Area Network), LAN (Local Area Network), or others.

For the host 2, application software (hereinafter simply referred to as an application) (AP) 2A is installed, and the host 2, with reference to this application 2A, performs the specified data processing, and reads and writes the required data from/to the primary storage system 3A via the communication path 4.

The primary storage system 3A comprises a disk device unit 11A comprising multiple disk devices 10A and a control unit 12A controlling data I/O for each of these disk devices 10A in the disk device unit 11A.

The disk devices 10A are configured of, for example, expensive disks such as SCSI (Small Computer System Interface) disks or inexpensive disk devices such as SATA (Serial AT Attachment) disks, optical disks and others. One RAID (Redundant Array of Inexpensive Disks) group 13A is configured of one or multiple disk devices 10A and, in the physical storage area provided by the respective disk devices 10A configuring the one RAID group 13A, one or multiple logical volumes are set. The data from the host 2 is stored in these logical volumes, in units of blocks (hereinafter referred to as logical blocks) of a specified size.

To each logical volume, a unique volume number is assigned. In the case of this embodiment, data input/output is performed by combining this volume number and the number unique to the logical block given to each logical block (LBA: Logical Block Address) into an address and by specifying the relevant address.

Meanwhile, the control unit 12A is configured of multiple channel adapters (CHAs) 20A, a cache memory 21A, a shared memory 22A, and multiple disk adapters (DKAs) 23A.

Each channel adapter 20A is configured as a microcomputer system comprising microprocessors (MPs) 30A and memories 31A, and comprises ports to be connected to the host 2 and a network 5 which is described later. Each channel adapter 20A interprets and performs various types of commands given from the host 2 and various types of commands sent from the secondary storage system 3B. To the ports of each channel adapter 20A, a network address (e.g., an IP address or a WWN) for identification is assigned, which enables each channel adapter 20A to individually operate as a NAS (Network Attached Storage).

The shared memory 22A is used mainly for storing various types of control information such as system configuration information related to the configuration of its entire own storage system, commands and others. Meanwhile, the cache memory 21A is used mainly for temporarily storing data to be input/output to/from its own storage system. These various types of control information, commands, and others stored in the shared memory 22A and the cache memory 21A are shared by all the channel adapters 20A and all the disk adapters 23A in the primary storage system 3A.

Each disk adapter 23A is configured as a microcomputer system comprising microprocessors 32A and memories (not shown in the figure), and operate as the interfaces performing protocol control in the communication with each of the disk devices 10A in the disk device unit 11A. Furthermore, the disk adapters 23A, in accordance with the read/write requests from the host 2, control the corresponding disk devices 10A in the disk device unit 11A, and read and write the required data from/to the relevant disk devices 10A.

The secondary storage system 3B is installed in the second site separated from the first site in which the host 2 and the primary storage system 3A are installed, and connected to the primary storage system 3A via the network 5 configured of, for example, SAN, LAN, Internet, a public line, a private line, and others.

As the hardware configuration of this secondary storage system 3B is the same as the hardware configuration of the primary storage system 3A, the details of the same are omitted from the description. Note that, in FIG. 1, the components in the secondary storage system 3B corresponding with the components in the primary storage system 3A are shown with the same numbers with the suffix "B" attached.

(2) Backup Method in Computing System (2-1) Main Configuration Related to Backup Method Next, the backup method in this above-mentioned computing system 1 is described below.

In the computing system 1 of this embodiment, as the backup method for backing up the data stored in the volumes in the primary storage system 3A by the host 2, the backup method linking the data copy between logical volumes performed in the same storage system and the asynchronous remote copy performed between different storage systems is adopted.

Figure 2:
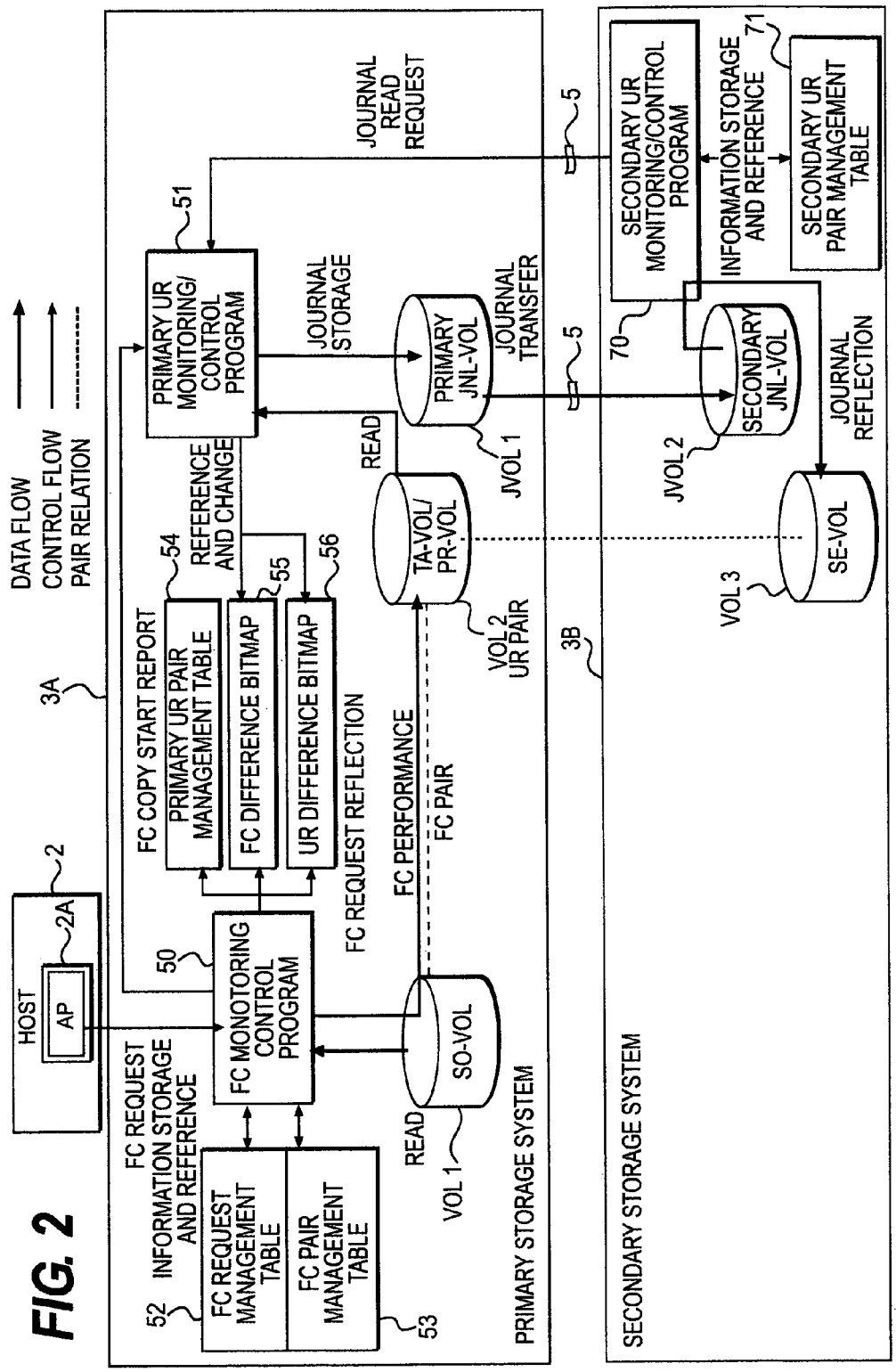
FIG. 2 is a block diagram showing an overview of the backup method in this computing system.

That is, in the case of this computing system 1, as shown in FIG. 2, the data written to the first logical volume VOL 1 in the primary storage system 3A is, in accordance with the requests from the host 2, copied to the second logical volume VOL 2 in the relevant primary storage system 3A. Then, the journal of the data copied to this second logical volume VOL 2 is created, and this journal is stored in the journal (JNL) volume (hereinafter referred to as a "primary journal volume") JVOL 1 installed in the primary storage system 3A.

Meanwhile, for the journal stored in the primary journal volume JVOL 1, asynchronously with the copy between the first and second logical volumes VOL 1, VOL 2, remote copy to the journal volume (hereinafter referred to as a "secondary journal volume") JVOL 2 installed in the secondary storage system 3B is performed. Subsequently, the journal is read from the secondary journal volume JVOL 2, and the data included in this journal is stored in the corresponding position in the third logical volume VOL 3 which is the backup volume of the first logical volume VOL 1 (the position of the same address as the address in the first logical volume VOL 1 where the data was stored).

Note that data copy performed between the logical volumes in the same storage system is hereinafter referred to as FC (Flash Copy) copy, and a pair of logical volumes between which FC copy is performed is referred to as an FC pair. Furthermore, the copy source volume of the FC pair is referred to as a source volume, and the copy destination volume is referred to as a target volume.

Therefore, in the case of this embodiment, data copy between the first and second logical volumes VOL 1, VOL 2 is equivalent to FC copy, and a pair of the first and second logical volumes is equivalent to an FC pair. Furthermore, in this FC pair, the first logical volume VOL 1 is equivalent to the source volume, and the second logical volume VOL 2 is equivalent to the target volume.

Meanwhile, remote copy using the journal performed between two logical volumes respectively installed in two different storage systems is hereinafter referred to as UR (Universal Replicator) copy, and a pair of logical volumes between which UR copy is performed is referred to as a UR pair. Furthermore, the copy source volume of the UR pair is referred to as a primary volume, and the copy destination volume is referred to as a secondary volume.

Therefore, in the case of this embodiment, remote copy between the second and third logical volumes VOL 2, VOL 3 is equivalent to UR copy, and a pair of these second and third logical volumes VOL 2, VOL 3 is equivalent to a UR pair. Furthermore, in this UR pair, the second logical volume VOL 2 is equivalent to the primary (PR) volume, and the third logical volume VOL 3 is equivalent to the secondary (SE) volume.

Figure 3:
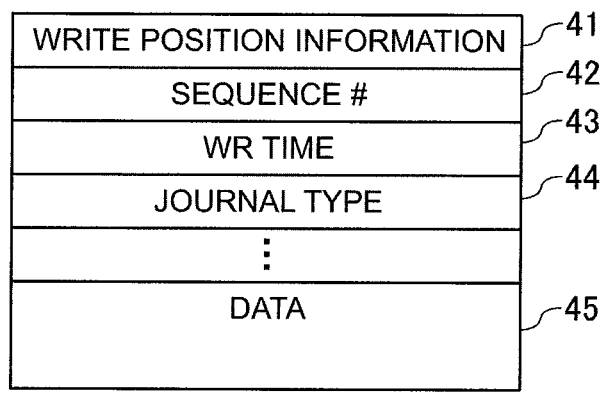
FIG. 3 is a conceptual diagram showing a journal conceptually.

At this point, the journal is the update history information of the logical volume (first logical volume VOL 1 in this embodiment) whose data the host 2 reads and writes. As shown in FIG. 3, the journal 40 is configured of the write position information 41 showing the data write position in the logical volume, the sequence number information 42 showing the journal group sequence number (serial number) given to the journal 40, the time information 43 showing the time when the data is written (WR) to the logical volume, the journal type information 44 showing the type of the journal, the data 45 itself, and others.

Note that the types of journals are data journals which are created with reference to the relevant data when data is written to the logical volume and control journals which are created for transmitting various types of control information to the opposite storage system regardless of data written to the logical volume. Control journals are used, for example, when the primary storage system 3A issues an instruction for changing the pair status of a UR pair to the secondary storage system 3B.

As a means for performing the backup by the above-mentioned backup method of this embodiment, as shown in FIG. 1, the memory 31A of each channel adapter 20A in the primary storage system 3A stores an FC monitoring/control program (FCPG) 50 and a primary UR monitoring/control program (URPG) 51 while the shared memory 22A in the primary storage system 3A stores an FC request management table 52, an FC pair management table 53, a primary UR pair management table 54, a FC difference bitmap 55, and an UR difference bitmap 56.

The FC monitoring/control program 50 is a program for monitoring and controlling the FC copy between the first and the second logical volumes VOL 1, VOL 2, and the primary UR monitoring/control program 51 is a program for monitor-ing and controlling the UR copy between the second and the third logical volumes VOL 2, VOL 3 in the primary storage system 3A.

Furthermore, the FC request management table 52 is a table for managing and maintaining FC request commands issued from the host 2 in the primary storage system 3A. The FC request commands issued from the host 2 to the primary storage system 3A are stored in this FC request management table 52.

Figure 4:
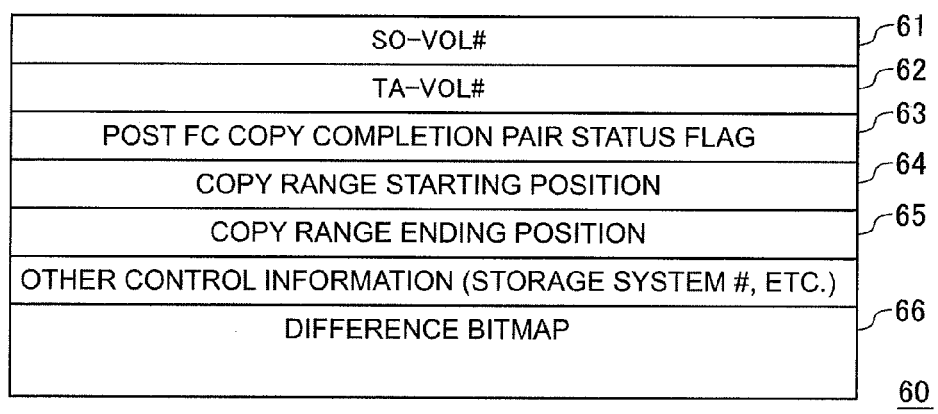
FIG. 4 is a conceptual diagram showing an FC request command conceptually.

At this point, as shown in FIG. 4, an FC request command 60 is configured of the source volume (SO-VOL) number field 61, the target volume (TA-VOL) number field 62, the post FC copy completion pair status flag field 63, the copy range starting position field 64, the copy range ending position field 65, the difference bitmap field 66, and others.

Then, the source volume number field 61 and the target volume number field 62 respectively store the volume numbers of the source volume (first logical volume VOL 1) and the target volume (second logical volume VOL 2) configuring the FC pair to perform FC copy. Meanwhile, the post FC copy completion pair status flag field 63 stores the flag (hereinafter referred to as the "post FC copy completion pair status flag") for specifying whether to maintain the pair status of the relevant FC pair even after the completion of the FC copy or not. Furthermore, the copy range starting position field 64 and the copy range ending position field 65 respectively store the starting address and the ending address of the storage area to perform the FC copy in the source volume. Furthermore, the difference bitmap field 66 stores the difference bitmap whose bits respectively made to correspond with each unit area updated by the host 2 in the storage area to perform the FC copy are set to ON ("1").

The FC request management table 52 is, corresponding with the FC request command including the above-mentioned configuration, as shown in FIG. 5, configured of the request number field 52A, the source volume number field 52B, the copy range starting position field 52C, the copy range ending position field 52D, the target volume number field 52E, the post FC copy completion pair status flag field 52F, and the difference bitmap field 52G.

Then, the request number field 52A stores the sequence number unique to the corresponding FC request command given as the FC request command. Furthermore, the source volume number field 52B, the target volume number field 52E, the copy range starting position field 52C, the copy range ending position field 52D, the post FC copy completion pair status flag field 52F, and the difference bitmap field 52G respectively store the information stored in the source volume number field 61, the target volume number field 62, the post FC copy completion pair status flag field 63, the copy range starting position field 64, the copy range ending position field 65, and the difference bitmap field 66 of the corresponding FC request command.

The FC pair management table 53 is a table for managing the FC pair set with reference to the FC request command and, as shown in FIG. 6, is configured of the pair number field 53A, the source volume number field 53B, the target volume number field 53C, and the FC pair status field 53D.

The pair number field 53A stores the identification number (FC pair number) unique to the relevant FC pair given to the corresponding FC pair, and the source volume number field 53B and the target volume number field 53C respectively store the volume number of the source volume (first logical volume VOL 1) and the volume number of the target volume (second logical volume VOL 2) of the FC pair.

Meanwhile, the FC pair status field 53D stores the pair status of the FC pair. Note that the "FC pair status" includes "pair," "copy," "split," "pair delete," and others. "Pair" indicates the status in which data copy from the source volume to the target volume is completed and the source volume and the target volume have become mirrored. Meanwhile, "copy" is the status in which data copy from the source volume to the target volume is in progress and the source volume and the target volume have not yet become mirrored. Furthermore, "split" indicates the status in which data write to the target volume is not performed and a snapshot of the source volume at a certain point of time is maintained by this target volume. Furthermore, "pair delete" indicates the status in which the FC pair has been deleted.

The FC difference bitmap 55 is a bitmap for managing the copy progress status in the above-mentioned FC copy and, if there are multiple first logical volumes VOL 1, the bitmap is created for each first logical volume VOL 1.

This FC difference bitmap 55 is, as shown in FIG. 7B, a bitmap in which bits are provided respectively corresponding with each unit area to which the corresponding address in the first logical volume VOL 1 is given, and the bits made to correspond with the copy target unit areas in the first logical volume VOL 1 (shaded unit areas $AR_10$ to $AR_17$, $AR_164$ to $AR_167$, ... in FIG. 7A) are set to ON ("1") while the bits made to correspond with the unit areas which are not the copy target (unshaded unit areas $AR_18$ to $AR_163$, ..., $AR_1n$ in FIG. 7A) are set to OFF ("0"). Note that the above-mentioned unit areas are basically logical blocks.

Meanwhile, the primary UR pair management table 54 is a table for managing the UR copy performed between the second and the third logical volumes VOL 2, VOL 3 in the primary storage system 3A. This primary UR pair management table 54 is, as shown in FIG. 8, configured of the pair number field 54A, the primary volume (P-VOL) number field 54B, the secondary volume (S-VOL) number field 54C, the UR pair status field 54D, the FC linkage flag field 54E, the FC difference bitmap (BMP) number field 54F, the UR difference bitmap number field 54G, the primary journal volume (JVOL) number field 54H, and the secondary journal volume number field 54I.

Then, the pair number field 54A stores the sequence number (UR pair number) given to the corresponding UR pair. This UR pair is set by the user in advance. Meanwhile, the primary volume number field 54B and the secondary volume number field 54C respectively store the volume numbers of the primary volume (second logical volume VOL 2) and the secondary volume (third logical volume VOL 3) of the UR pair.

Furthermore, the UR pair status field 54D stores the status of the UR pair. Note that the "UR pair status" includes "Duplex," "Duplex-Pending," and "Split." Each of these indicates the same pair status as "pair," "copy," and "split."

The FC linkage flag field 54E stores the flag for showing whether to perform UR copy in linkage with FC copy (hereinafter referred to as the "FC linkage flag") or not. This FC linkage flag is set to "1" if the above-mentioned linkage is performed and is set to "0" if the above-mentioned linkage is not performed. Therefore, if the FC linkage flag is "1," for the data for which FC copy to the second logical volume VOL 1 is performed, UR copy to the third logical volume VOL 3 is performed while, if the FC linkage flag is "0," for the data for which FC copy to the second logical volume VOL 1 is performed, UR copy to the third logical volume VOL 3 is not performed.

Furthermore, the FC difference bitmap number field 54F and the UR difference bitmap number field 54G respectively store the identification number (FC difference bitmap number) of the FC difference bitmap 55 or the identification number (UR difference bitmap number) of the UR difference bitmap 56 to be described later (in FIG. 2) made to correspond with the primary volume of the corresponding UR pair.

Furthermore, the primary journal volume number field 54H and the secondary journal volume number field 54I respectively store the volume number of the journal volume in the primary storage system 3A (primary journal volume JVOL 1) and the volume number of the secondary journal volume JVOL 2 in the secondary storage system 3B used for UR copy in the relevant UR pair.

The UR difference bitmap 56 is a bitmap for managing the copy progress status in UR copy and, if there are multiple second logical volumes VOL 2, the bitmap is created for each second logical volume VOL 2.

Figure 9:
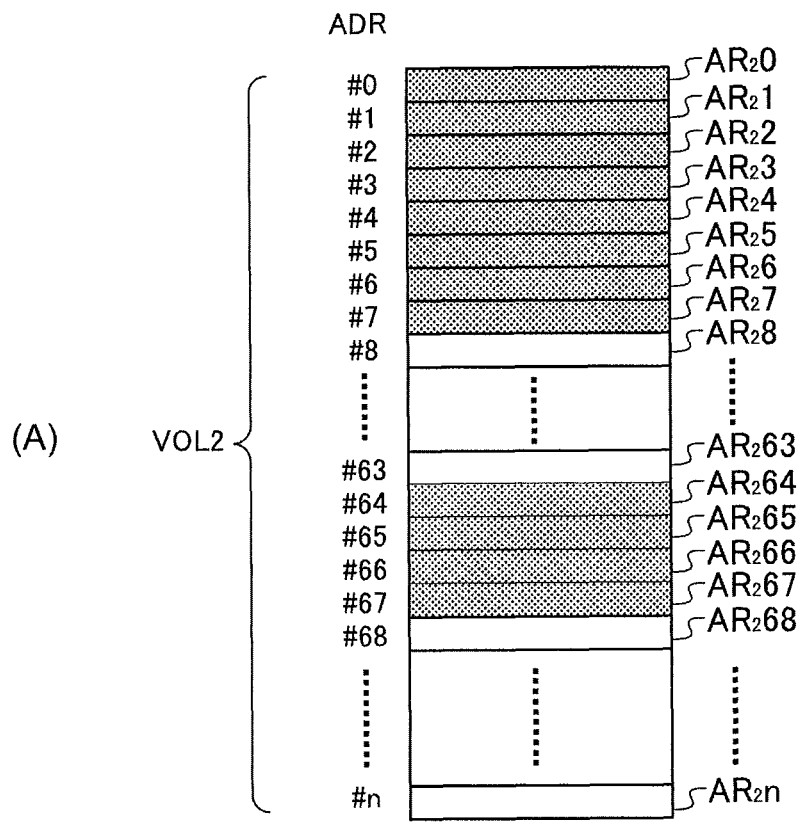
FIG. 9A and FIG. 9B are conceptual diagrams for the description of a UR difference bitmap.

This UR difference bitmap 56 is, as shown in FIG. 9B, a bitmap in which bits are provided respectively corresponding with each unit area to which the corresponding address in the second logical volume VOL 2 is given, and the bits made to correspond with the copy target unit areas in the second logical volume VOL 2 (shaded unit areas $AR_20$ to $AR_27$, $AR_264$ to $AR_267$, ... in FIG. 9A) are set to ON ("1") while the bits made to correspond with the unit areas which are not the copy target (unshaded unit areas $AR_28$ to $AR_263$, ..., $AR_2n$ in FIG. 9A) are set to OFF ("0"). Note that the above-mentioned unit areas are basically logical blocks.

Meanwhile, as a means for performing the backup by the above-mentioned backup method of this embodiment, as shown in FIG. 1, the memory 31B of each channel adapter 20B in the secondary storage system 3B stores a secondary UR monitoring/control program 70, and the shared memory 22B of the secondary storage system 3B stores a secondary UR pair management table 71.

Among the foregoing, the secondary UR monitoring/control program 70 is a program for monitoring and controlling the UR copy between the second and the third logical volumes VOL 2, VOL 3 in the secondary storage system 3B.

Meanwhile, the secondary UR pair management table 71 is a table for managing the UR copy performed between the second and the third logical volumes VOL 2, VOL 3 in the secondary storage system 3B and, as shown in FIG. 10, configured of the pair number field 70A, the primary volume number field 70B, the secondary volume number field 70C, the primary journal volume number field 70D, the secondary journal volume number field 70E, and the UR pair status field 70F.

Then, these fields; that is, the pair number field 70A, the primary volume number field 70B, the secondary volume number field 70C, the primary journal volume number field 70D, the secondary journal volume number field 70E, and the UR pair status field 70F respectively store the same information stored in the pair number field 54A, the primary volume number field 54B, the secondary volume number field 54C, the primary journal volume number field 54H, the secondary journal volume number field 54I, and the UR pair status field 54D in the primary UR pair management table 54 (FIG. 8).

(2-2) Various Types of Processing Related to Backup Method

Next, the various types of processing routine related to the backup method in this embodiment are described below.

Note that, in the description below, though the subject of the various types of processing is assumed to be a "program," it is obvious that the microprocessors 30A or 30B of the corresponding channel adapters 20A or 20B in the primary storage system 3A or the secondary storage system 3B actually perform the relevant processing in accordance with the program.

(2-2-1) Processing of FC Monitoring/Control Program

Firstly, the processing routine of the FC monitoring/control program 50 related to this backup method is described below.

Figure 11A:
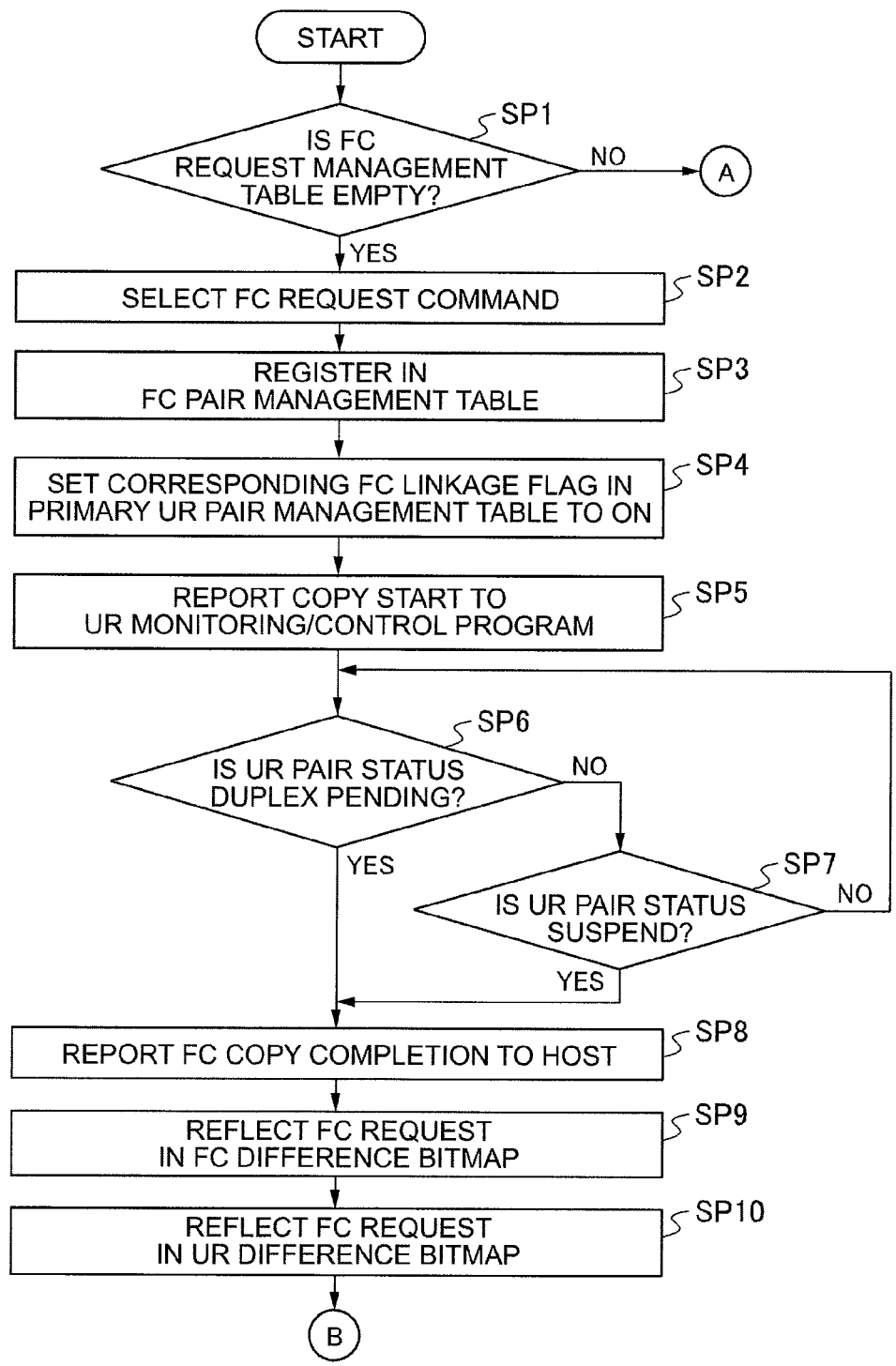
FIG. 11A is a flowchart showing the processing routine of the FC request command performance processing.
Figure 11B:
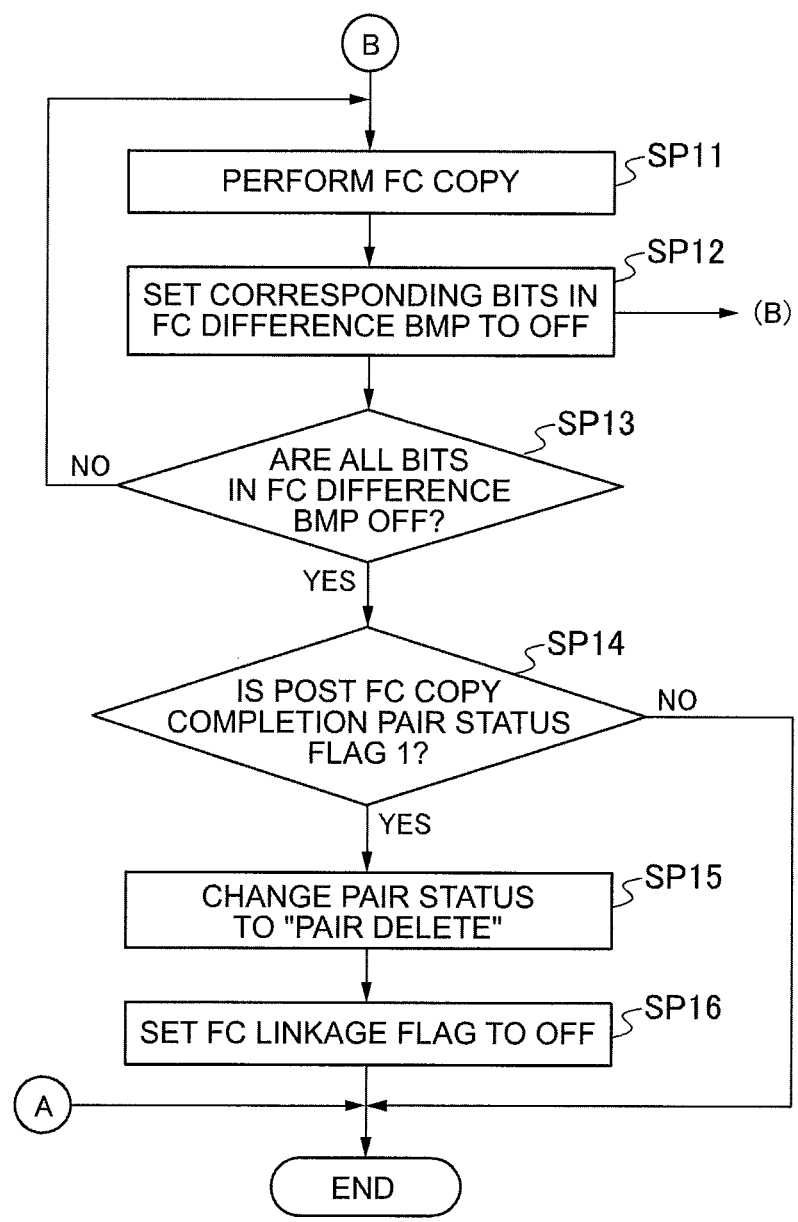
FIG. 11B is a flowchart showing the processing routine of the FC request command performance processing.

FIG. 11A and FIG. 11B show the processing routine of the FC request command performance processing performed by the FC monitoring/control program 50.

That is, the FC monitoring/control program 50 starts this FC request command performance processing regularly or irregularly and, firstly, determines whether at least one FC request command is registered to the FC request management table 52 or not (SP1).

Then, the FC monitoring/control program 50, if obtaining a negative result in this determination, completes this FC request command performance processing.

On the other hand, the FC monitoring/control program 50, if obtaining an affirmative result in this determination, selects the least recently received FC request command of the FC request commands registered to the FC request management table 52 (SP2).

Next, the FC monitoring/control program 50 registers the FC pair comprised of the source volume and the target volume specified by the selected FC request command in the FC pair management table 53. As more specifically described, the FC monitoring/control program 50 assigns an FC pair number to the FC pair, stores the relevant FC pair number in the pair number field 53A for the new entry in the FC pair management table 53 (FIG. 6), and registers the volume numbers of the source volume and the target volume specified by the FC request command in the source volume number field 53B (FIG. 6) and the target volume number field 53C (FIG. 6) of the entry, respectively. Furthermore, the FC monitoring/control program 50 stores "Pair" as the pair status of the FC pair in the FC pair status field 53D (FIG. 6) of the entry (SP3).

Next, the FC monitoring/control program 50, from the entries in the primary UR pair management table 54 (FIG. 8), searches the entry in which the volume number of the target volume of the FC pair registered to the FC pair management table 53 at step SP3 is stored in the primary volume number field 54B (FIG. 8), and sets the FC linkage flag stored in the FC linkage flag field 54E (FIG. 8) of the entry to on ("1") (SP4).

Furthermore, the FC monitoring/control program 50 sends an FC copy start report indicating that the FC copy of the FC pair registered to the FC pair management table 53 at step SP3 is started to the UR monitoring/control program 51 (FIG. 1 and FIG. 2) (SP5).

Then, the FC monitoring/control program 50 starts the above-mentioned FC copy and, firstly, refers to the pair status field 54D (FIG. 8) of the entry detected at step SP4 in the primary UR pair management table 54 (FIG. 8) (that is, the entry in which the volume number of the second logical volume VOL 2 specified as the target volume by the FC request command is stored in the primary volume number field 54B), and determines whether the pair status of the UR pair corresponding with the relevant entry is "Duplex Pending" or not (SP6).

The FC monitoring/control program 50, if obtaining a negative result in this determination, refers to the pair status field 54D (FIG. 8) of the above-mentioned entry again, and determines whether the pair status of the UR pair is "Suspend" or not (SP7).

The FC monitoring/control program 50, if obtaining a negative result in this determination, returns to step SP6 and, subsequently, repeats the step-SP6-step-SP7-step-SP6 loop until obtaining an affirmative result at step SP6 or step SP7.

Then, the FC monitoring/control program 50, when obtaining an affirmative result at step SP6 or step SP7 in due course of time, sends the completion report of the FC copy in accordance with the above-mentioned FC copy to the host 2 (SP8).

Figure 7:
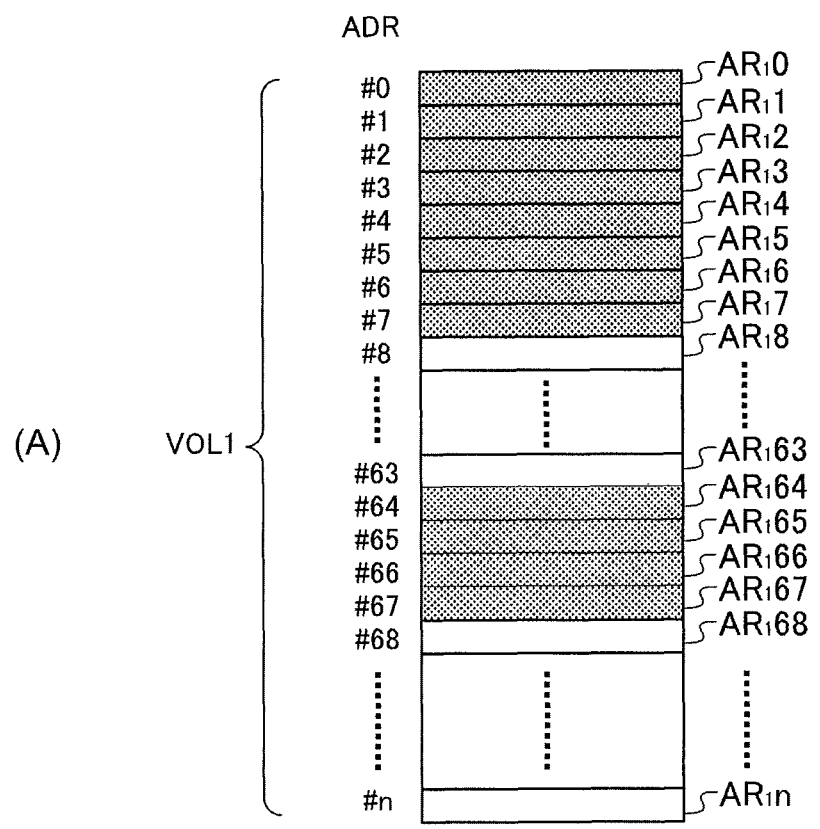
FIG. 7A and FIG. 7B are conceptual diagrams for the description of an FC difference bitmap.

Next, the FC monitoring/control program 50 reflects the status of the difference bitmap included in the above-mentioned FC request command in the FC difference bitmap 55 (FIG. 2 and FIG. 7). As more specifically described, the FC monitoring/control program 50 makes each of the bits in the above-mentioned difference bitmap correspond to each of the bits in the FC difference bitmap 55, and sets each of the bits which are set to ON in the relevant difference bitmap to correspond respectively to each of the bits in the FC difference bitmap set to ON (SP9).

Furthermore, the FC monitoring/control program 50, by the same method as this, reflects the status of the difference bitmap included in the above-mentioned FC request command in the UR difference bitmap 56 (FIG. 2 and FIG. 9) (SP10).

Next, the FC monitoring/control program 50 performs FC copy in accordance with the FC request command. As more specifically described, the FC monitoring/control program 50, from the storage area identified by the copy range starting position and the copy range ending position specified by the FC request command in the first logical volume VOL 1 specified as the source volume by the FC request command, copies the data stored in the unit area corresponding with one bit set to ON in the difference bitmap 55 included in the FC request command to the unit area of the same address in the second logical volume VOL 2 specified as the target volume by the FC request command (SP11).

Furthermore, the FC monitoring/control program 50 changes the bits of the FC difference bitmap 55 made to correspond with the bits of the difference bitmap copied at that time to OFF ("0") (SP12) and, subsequently, determines whether all the bits in the FC difference bitmap 55 are set to OFF or not (SP13).

The FC monitoring/control program 50, if obtaining a negative result in this determination, returns to step SP11 and, subsequently, repeats the step-SP11-step-SP13-step-SP11 loop until obtaining an affirmative result at step SP13.

Then, the FC monitoring/control program 50, when obtaining an affirmative result at step SP13 in due course of time by completing the FC copy specified by the FC request command, determines whether the post FC copy completion pair status flag stored in the post FC copy completion pair status flag field 52F (FIG. 5) of the entry corresponding with the FC request command which is the target at that time in the FC request management table 52 (FIG. 5) is set to ON ("1") or not (SP14).

In this case, ordinary FC request commands set the post FC copy completion pair status flag to ON. Therefore, an affirmative result can be obtained at this step SP14 normally and, in this case, the FC monitoring/control program 50 changes the pair status of the corresponding FC pair stored in the FC pair status field 53D (FIG. 6) of the corresponding entry in the FC pair management table 53 (FIG. 6) to "pair delete" (SP15).

Furthermore, the FC monitoring/control program 50 resets the FC linkage flag which is set to ON at step SP4 in the primary UR pair management table 54 (FIG. 8) to OFF ("0") indicating that FC linkage is not performed (SP16) and, subsequently, completes the FC request command performance processing.

Note that the FC monitoring/control program 50, if obtaining a negative result in the determination at step SP14, completes the FC request command performance processing.

(2-2-2) Processing of Primary UR Monitoring/Control Program

Next, the processing routine of the primary UR monitoring/control program 51 related to this backup method is described below.

Figure 12:
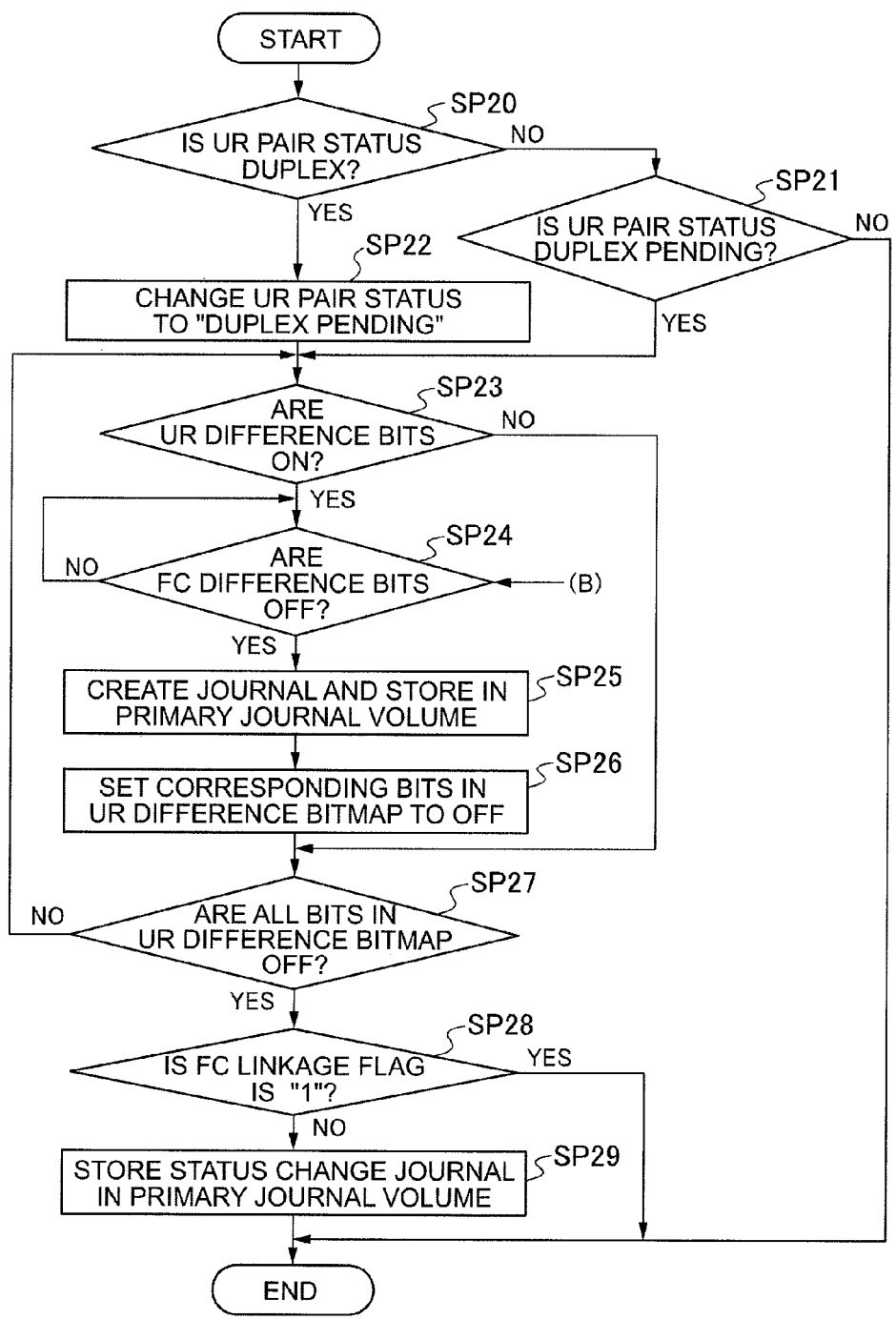
FIG. 12 is a flowchart showing the processing routine of the journal creation processing.

FIG. 12 shows the processing routine of the journal creation processing performed by the primary UR monitoring/control program 51 which received the above-mentioned FC copy start report at step SP5 of the FC request command performance processing (FIG. 11A and FIG. 11B). The primary UR monitoring/control program 51, by this journal creation processing, creates the journals of the data for which FC copy is completed.

That is, the primary UR monitoring/control program 51, upon receiving the above-mentioned FC copy start report, starts this journal creation processing and, firstly, searches the UR pair whose primary volume is the second logical volume VOL 2 for which the FC copy was performed at that time in the primary UR pair management table 54 (FIG. 8), refers to the UR pair status field 54D (FIG. 8) of the entry corresponding with the UR pair, and sequentially determines whether the pair status of the above-mentioned UR pair is either "Duplex" or "Duplex Pending" or not (SP20, SP21).

Then, the primary UR monitoring/control program 51, if the pair status of the above-mentioned UR pair is "Duplex" (SP20: YES), changes the pair status of the UR pair to "Duplex Pending," and proceeds to step SP23.

Meanwhile, if the pair status of the above-mentioned UR pair is "Duplex Pending" (SP21: YES), the primary UR monitoring/control program 51 directly proceeds to step SP23. Furthermore, the primary UR monitoring/control program 51, if the pair status of the above-mentioned UR pair is neither "Duplex" nor "Duplex Pending" (SPSP21: NO), completes this journal creation processing.

Meanwhile, the primary UR monitoring/control program 51, upon proceeding to step SP23, refers to the UR difference bitmap 56 and determines whether any bits are set to ON or not (SP23).

Then, the primary UR monitoring/control program 51, if obtaining a negative result in this determination, proceeds to step SP27 or, if obtaining an affirmative result, determines whether the bits made to correspond with the bits in the UR difference bitmap 56 which were confirmed to be on at step SP23 among the bits in the FC difference bitmap 55 are set to OFF or not (SP24).

At this point, obtaining a negative result in this determination indicates that the FC copy for the data stored in the unit area in the first logical volume VOL 1 made to correspond with the bits in the FC difference bitmap 55 is not completed yet. Therefore, at this time, the primary UR monitoring/control program 51 waits for the above-mentioned bits in the FC difference bitmap 55 to be OFF (SP24).

At this point, obtaining an affirmative result in the determination at step SP24 indicates that the FC copy for the data stored in the unit area in the first logical volume VOL 1 made to correspond with the bits in the FC difference bitmap 55 is completed.

Therefore, at this time, the primary UR monitoring/control program 51 reads the data of the unit area which is stored in the primary volume (second logical volume VOL 2) of the UR pair which is the target at that time and for which the above-mentioned FC copy is completed, and creates the journals mentioned above for FIG. 3 of this data. Furthermore, the primary UR monitoring/control program 51 stores the journals created as mentioned above in the primary journal volume JVOL 1 (FIG. 2) (SP25).

Next, the primary UR monitoring/control program 51, among the unit areas of the second logical volume VOL 2, sets the bits in the UR difference bitmap 56 made to correspond with the unit area storing the data for which the journal was created at step SP25 to OFF (SP26) and, subsequently, determines whether all the bits in the UR difference bitmap 56 are OFF or not (SP27).

Obtaining a negative result in this determination indicates that, among the bits in the FC difference bitmap 55 set to ON at step SP9 of the FC request command performance processing (FIG. 11A and FIG. 11B), the bits for which the journals of the data stored in the corresponding unit areas in the first logical volume VOL 1 are not created exist. Therefore, at this time, the primary UR monitoring/control program 51 returns to step SP23 and repeats the processing at step-SP23-step-SP27-step-SP23.

Figure 13:
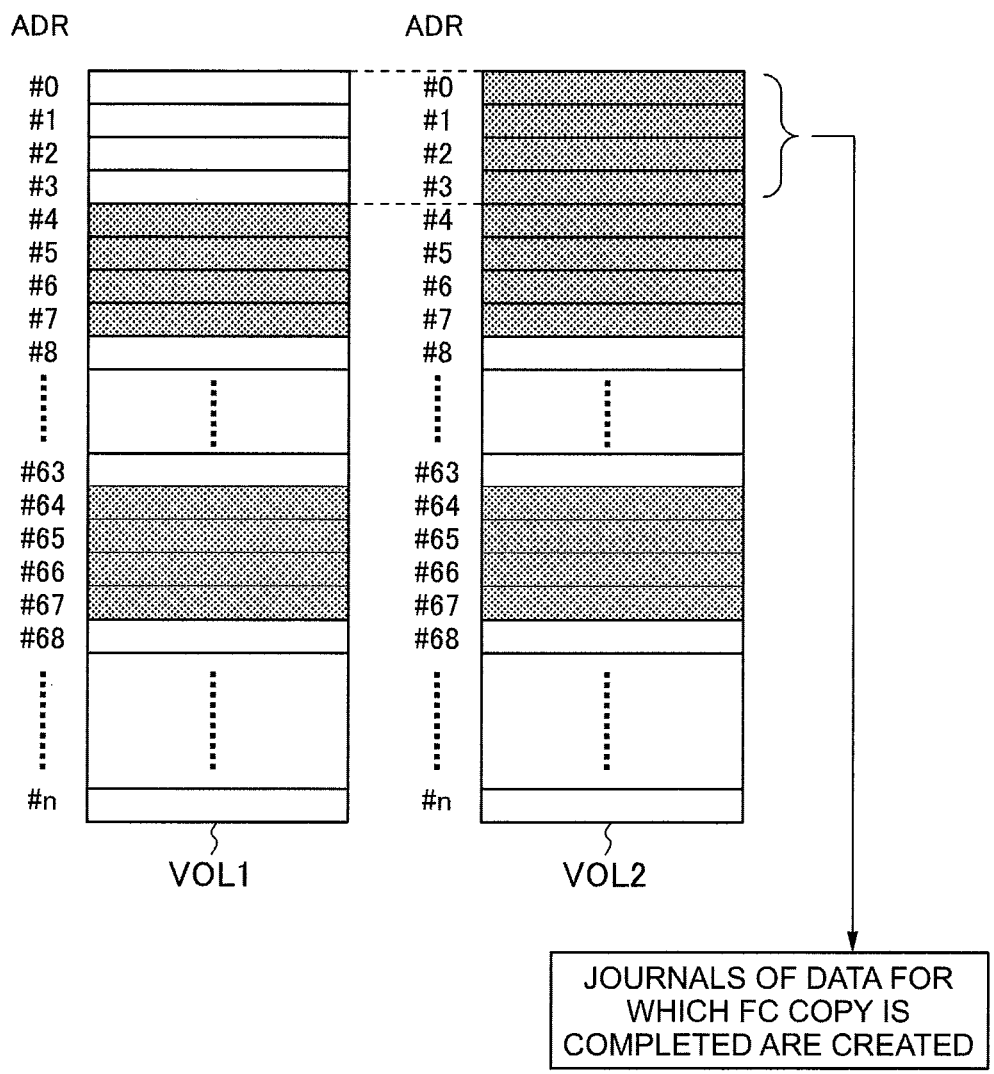
FIG. 13 is a conceptual diagram for the description of the journal creation processing.

By repeating the above-mentioned processing at step-SP23-step-SP27-step-SP23, as shown in FIG. 13, if the FC copy is performed for the data stored in the unit areas as the copy target in the first logical volume VOL 1 to the second logical volume VOL 2, the journal of the data should be created sequentially by the primary UR monitoring/control program 51.

Furthermore, the primary UR monitoring/control program 51, if obtaining an affirmative result at step SP27 by, in due course of time, completing the creation of the journals of the data (that is, all the data as the backup target) stored in the respective unit areas in the first logical volume respectively corresponding with each of bits set to ON at step SP9 of the FC request command performance processing (FIG. 11A and FIG. 11B), determines whether the FC linkage flag stored in the FC linkage flag field 54E (FIG. 8) of the entry corresponding with the UR pair which is the target at that time in the primary UR pair management table 54 (FIG. 8) is ON or not (SP28).

The primary UR monitoring/control program 51, if obtaining an affirmative result in this determination, completes this journal creation processing.

Meanwhile, the primary UR monitoring/control program 51, if obtaining a negative result at the above-mentioned determination, changes the pair status stored in the UR pair status field 54D (FIG. 8) of the corresponding entry in the primary UR pair management table 54 (FIG. 2 and FIG. 8) from "Duplex" to "Duplex Pending." Furthermore, the primary UR monitoring/control program 51 creates the control journal (hereinafter referred to as a "status change journal") for changing the pair status stored in the UR pair status field 70F of the corresponding entry in the secondary UR pair management table 71 (FIG. 2 and FIG. 10) from "Duplex" to "Duplex Pending," and stores the created status change journal in the primary journal volume JVOL 1 (FIG. 2) (SP29). Then, subsequently, the primary UR monitoring/control program 51 completes this journal creation processing.

Figure 14:
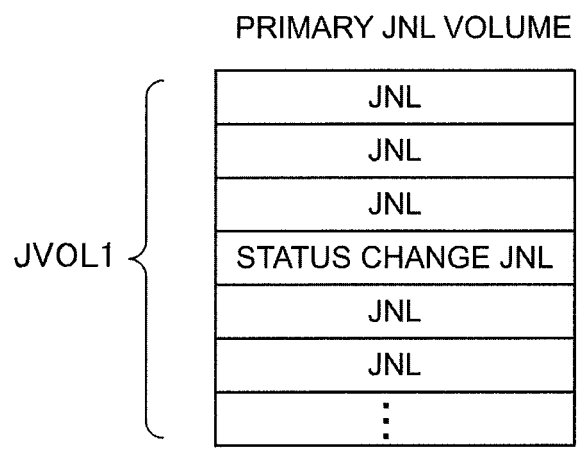
FIG. 14 is a conceptual diagram for the description of a status change journal.

Therefore, as shown in FIG. 14, each time FC copy between one FC pair is completed and all the journals of the respective pieces of data for which FC copy is performed to the target volume (second logical volume VOL 2) at that time are created, the status change journal is created and stored in the primary journal volume JVOL 1.

Figure 15:
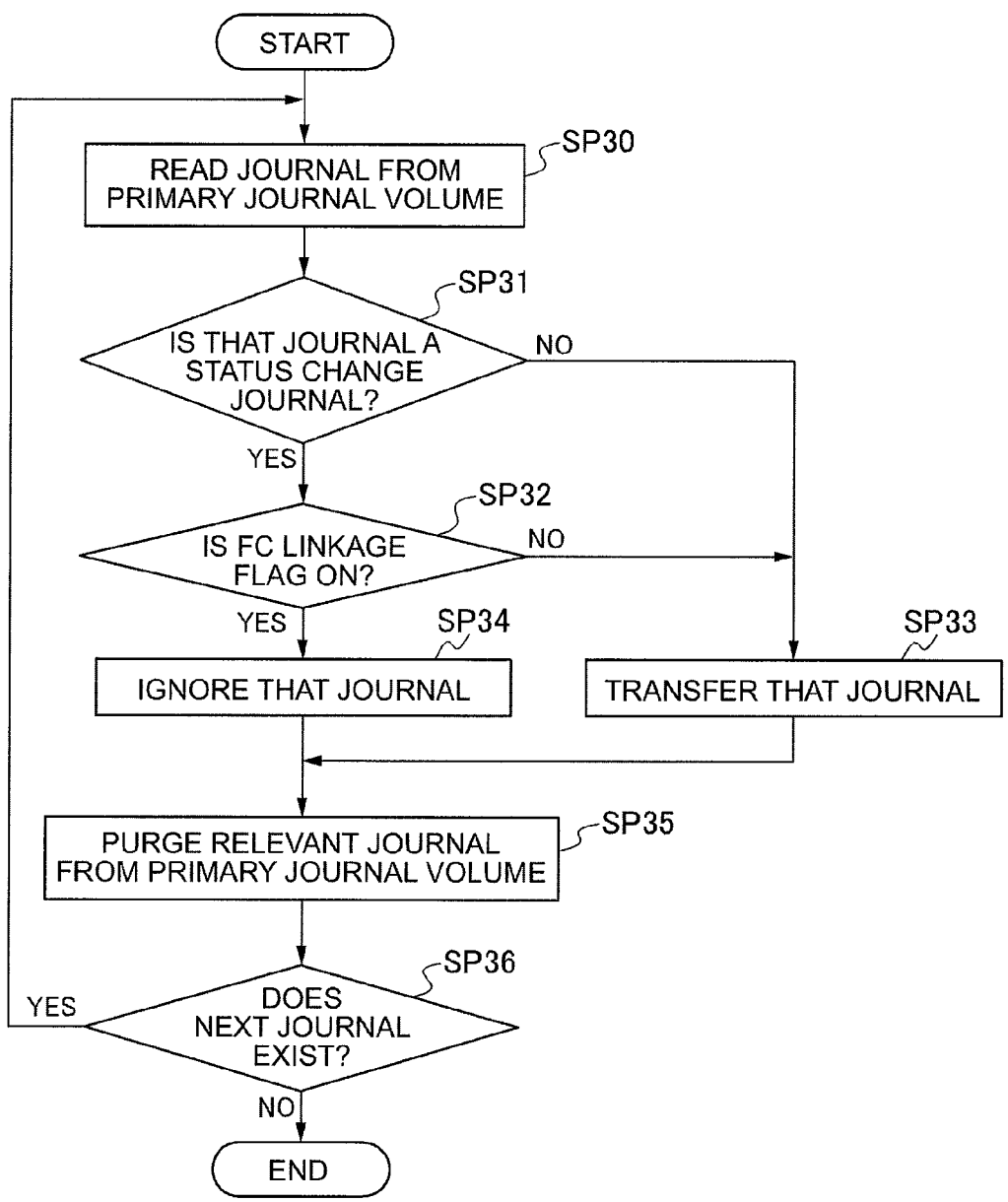
FIG. 15 is a flowchart showing the processing routine of the journal transfer processing.

Meanwhile, FIG. 15 shows the processing routine of the journal transfer processing performed independently of the above-mentioned journal creation processing. The primary UR monitoring/control program 51, in response to requests from the secondary storage system 3B, in accordance with the processing routine of this journal transfer processing, transfers the journals stored in the primary journal volume JVOL 1 to the secondary storage system 3B.

That is, the primary UR monitoring/control program 51, when receiving a journal read request, which is described later, from the channel adapter 20B of the secondary storage system 3B (FIG. 1), starts the journal transfer processing shown in this FIG. 15 and, firstly, from the journals stored in the primary journal volume JVOL 1, reads the least recent journal (whose sequence number is the smallest) (SP30).

Next, the primary UR monitoring/control program 51 determines whether the journal read at that time is the status change journal or not (SP31). Then, the primary UR monitoring/control program 51, if obtaining a negative result in this determination, proceeds to step SP33 while, if obtaining an affirmative result, determines whether the FC linkage flag stored in the FC linkage flag field 54E of the entry corresponding with the UR pair whose journal is exchanged in the primary UR pair management table 54 (FIG. 8) is set to ON ("1") or not (SP32).

At this point, obtaining a negative result in this determination indicates that, in the primary storage system 3A, after FC copy in accordance with an FC request command is completed, before UR copy is completed for the data for which FC copy is performed, the next FC request command to the same FC pair is issued from the host 2 (refer to step SP4 in FIG. 11A and step SP16 in FIG. 11B).

In the above-mentioned situation, when the status change journal is transferred to the secondary storage system 3B, if the FC copy with reference to the above-mentioned next FC request command is already started, even though the contents of the current primary volume and the contents of the current secondary volume (same as the contents of the primary volume at the point of time when the status change journal is created) are different, as described later, in accordance with this status change journal, the pair status stored in the pair status field 54D of the corresponding entry in the secondary UR pair management table 54 (FIG. 8) is changed to "Duplex" (refer to step SP45 in FIG. 16).

The above-mentioned phenomenon occurs because, in this embodiment, the asynchronous method is adopted as the method of remote copy between the primary storage system 3A and the secondary storage system 3B, which causes time lag between the performance time of FC copy and the performance time of UR copy.

Therefore, the primary UR monitoring/control program 51, if obtaining a negative result in the determination of step SP32, transfers the journal read from the primary journal volume JVOL 1 at step SP30 to the secondary storage system 3B (SP33) while, if obtaining an affirmative result in the determination of step SP32, does not transfer the journal to the secondary storage system 3B but ignores it (SP34).

Therefore, the primary UR monitoring/control program 51, subsequently, deletes the journal read from the primary journal volume JVOL 1 at step SP30 from the primary journal volume JVOL 1 (SP35).

Next, the primary UR monitoring/control program determines whether the next journal exists in the primary journal volume JVOL 1 or not (SP36) and, if obtaining an affirmative result, returns to step SP30 and, subsequently, repeats the step-SP30-step-SP36-step-SP30 loop.

Then, the primary UR monitoring/control program 51, when obtaining an affirmative result at the SP36 in due course of time by completing the transfer of all the journals stored in the primary journal volume JVOL 1 to the secondary storage system 3B, completes this journal transfer processing.

(2-2-3) Processing by Secondary UR Monitoring/Control Program

Figure 16:
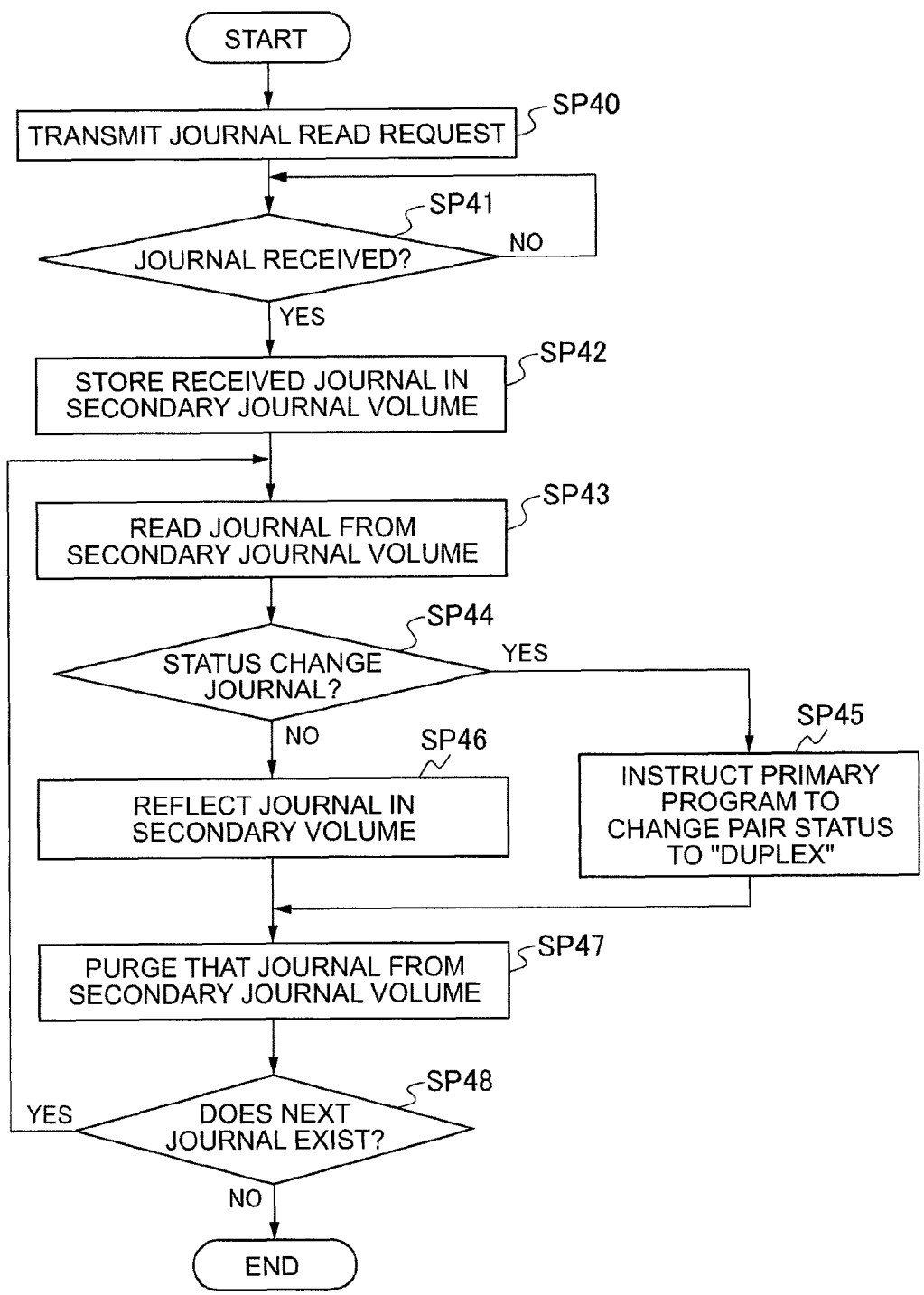
FIG. 16 is a flowchart showing the processing routine of the journal reflection processing.

Meanwhile, FIG. 16 shows the processing routine of the secondary UR monitoring/control program 70 (FIG. 2) related to this backup method.

The secondary UR monitoring/control program 70, in accordance with the journal reflection processing shown in this FIG. 16, requires the journal transfer of the primary storage system 3A, and reflects the transferred journal in the secondary volume (third logical volume VOL 3).

That is, the secondary UR monitoring/control program 70 starts this journal reflection processing regularly or irregularly, firstly sends a journal read request to the primary storage system 3A (SP40), and then waits for the journal to be transferred from the primary storage system 3A (SP41).

Then, the secondary UR monitoring/control program 70, when the journal is transferred from the primary storage system 3A in due course of time, stores the journal in the secondary journal volume JVOL 2 (FIG. 2) (SP42).

Next, the secondary UR monitoring/control program 70 reads the journal whose sequence number stored in the relevant journal is the least recent from the secondary journal volume JVOL 2 (SP43), and determines whether the journal is the status change journal or not (SP44).

The secondary UR monitoring/control program 70, if obtaining an affirmative result in this determination, instructs the primary UR monitoring/control program 51 (FIG. 2) of the corresponding channel adapter 20A (FIG. 1) to change the status of the corresponding UR pair stored in the pair status field 54D (FIG. 8) of the entry corresponding with the journal of the primary UR pair management table 54 (FIG. 8) to "Duplex" (SP45). The primary UR monitoring/control program 51, receiving this instruction as mentioned above, changes the pair status stored in the pair status field of the corresponding entry in the primary UR pair management table 54 to "Duplex."

Meanwhile, the secondary UR monitoring/control program 70, if obtaining a negative result in the determination of step SP44, reflects the journal in the corresponding secondary volume. As more specifically described, the secondary UR monitoring/control program 70 stores the data included in the relevant journal in the unit area specified by the journal of the secondary volume specified by the journal (SP46).

Next, the secondary UR monitoring/control program 70 deletes the journal from the secondary journal volume JVOL 2 (SP47) and determines whether the next journal exists in the secondary journal volume JVOL 2 or not (SP48).

Then, the secondary UR monitoring/control program 70, if obtaining an affirmative result in this determination, returns to step SP43 and, subsequently, repeats the loop of step-SP43-step-SP48-step-SP43.

Then, the secondary UR monitoring/control program 70, when obtaining a negative result at step SP48 by, in due course of time, completing the reflection of all the journals stored in the secondary journal volume JVOL 2 in the secondary volume, completes this journal reflection processing.

(3) Advantageous Effects of this Embodiment

As mentioned above, as the computing system 1 by this embodiment performs remote copy between the primary storage system 3A and the secondary storage system 3B in the asynchronous method, even if the distance between the first site where the primary storage system 3A is installed and the second site where the secondary storage system 3B is installed is large, remote copy can be performed efficiently between the primary storage system 3A and the secondary storage system 3B. Therefore, the backup efficiency for backing up the data written to the first logical volume VOL 1 in the third logical volume VOL 3 can be improved.

(4) Other Embodiments

Note that, though the above-mentioned embodiment describes the case where this invention is applied to the computing system 1 configured as shown in FIG. 1 and FIG. 2, this invention is not limited to this case but may also be permitted to be broadly applied to various other types of computing systems.

Furthermore, though the above-mentioned embodiment describes the case where, in accordance with copy requests from the host, the function as the first copy monitoring/control unit for copying the data written to the first logical volume in the primary storage system 3A (first storage system) to the second logical volume in the relevant primary storage system 3A and the function as the second copy monitoring/control unit for transferring the data copied to the second logical volume VOL 2 to the secondary storage system 3B (second storage system) asynchronously from the data write from the host 2 to the first logical volume VOL 1 are installed in each of the channel adapters 20A in the primary storage system 3A, this invention is not limited to this case but it may also be permitted to divide and install these functions in separate hardware. For example, it may also be permitted to install the function as the second copy monitoring/control unit only in the channel adapters 20A connected to the network 5 (FIG. 1) of the primary storage system 3A.

Furthermore, though the above-mentioned embodiment describes the case where the function as the third copy monitoring/control unit for writing the copy target data transferred from the primary storage system 3A (first storage system) to the third logical volume VOL 3 is installed in each of the channel adapters 20B in the secondary storage system 3B, this invention is not limited to this case but it may also be permitted to install the above-mentioned function in one hardware collectively. For example, it may also be permitted to install the function as the third copy monitoring/control unit only in the channel adapters 20B connected to the network 5 of the secondary storage system 3B.

INDUSTRIAL APPLICABILITY

This invention can be broadly applied to computing systems for performing backup using the in-storage copy function and the remote copy function.

The invention claimed is:

1. A computing system comprising a first storage system and a second storage system and which backs up data written from a host into a first logical volume in the first storage system to a third logical volume in the second storage system,
  wherein the first storage system comprises:
  a first copy monitoring/control unit for copying data written into the first logical volume in the first storage system to a second logical volume in the first storage system according to a copy request from the host; and
  a second copy monitoring/control unit for creating a journal, including the data which was copied to the second logical volume, as update history information of the first logical volume from the data which was copied to the second logical volume, storing the journal in a journal volume in the first storage system, and transferring to the second storage system the journal containing the data, which was created from the data copied to the second logical volume, asynchronously with the writing of other data from the host into the first logical volume; and a first difference bitmap for managing the copying of data from the first logical volume to the second logical volume, and creating the journal from second logical volume,
  wherein the first copy monitoring/control unit sets each bit of the first difference bitmap corresponding to each unit area of the second logical volume which stores data copied from the first logical volume to a first status to indicate the unit areas of the second logical volume which are copy targets for the second storage system according to the copy request from the host,
  wherein the second copy monitoring/control unit creates, in the journal volume, the journal for areas in the second logical volume corresponding to the bits set in the first difference bitmap after the data written into the first logical volume is copied to the second logical volume, and
  wherein the second storage system comprises:
  a third copy monitoring/control unit for writing the data which was transferred from the first storage system into the third logical volume.

2. The computing system according to claim 1,
  wherein the second copy management/control unit creates a prescribed control journal each time it completes creating a journal of all data which was copied to the second logical volume based on one copy request, transfers the created journals to the second storage system in the order that they were created, and, upon transferring the control journal from the second logical volume to the third logical volume, does not transfer the control journal to the third logical volume if copy based on a subsequent copy request has been started between the second logical volume and the first logical volume.

3. The computing system according to claim 1,
  wherein the first storage system comprises:
  a second difference bitmap for managing the transferring of data from the first storage system to the third logical volume,
  wherein the first copy monitoring/control unit:
  sets each bit corresponding to each unit area of the first logical volume storing copy-target data in the first and second difference bitmap to a first status according to the copy request from the host; and
  changes the status of the corresponding bit in the first difference bitmap to a second status each time data stored in the unit area of the first logical volume is copied to a corresponding unit area in the second logical volume, and
  wherein the second copy monitoring/control unit transfers, to the second storage system, data stored in a unit area among the unit areas in the second logical volume in which the corresponding bit in the first difference bitmap is set to a second status and the corresponding bit in the second difference bitmap is set to a first status, and changes the status of the bit corresponding to the unit area of the second difference bitmap to the second status.

4. The computing system according to claim 1,
  wherein the host designates a pair status of the first and second logical volumes after the copy is complete in the copy request, and
  wherein the first copy monitoring/control unit changes the pair status of the first and second logical volumes to the pair status designated in the copy request after the copy between the first and second logical volumes is complete.

5. A backup method in a computing system comprising a first storage system and a second storage system and which backs up data written from a host into a first logical volume in the first storage system to a third logical volume in the second storage system, comprising:

a first step of copying data written into the first logical volume in the first storage system to a second logical volume in the first storage system according to a copy request from the host;

a second step of creating a journal, including the data which was copied to the second logical volume, as update history information of the first logical volume from the data which was copied to the second logical volume, storing the journal in a journal volume in the first storage system, and transferring to the second storage system the journal containing the data, which was created from the data copied to the second logical volume, asynchronously with the writing of other data from the host into the first logical volume; and a third step of writing the data which was transferred from the first storage system into the third logical volume, wherein the first storage system has a first difference bitmap for managing the copying of data from the first logical volume to the second logical volume, and creating the journal from second logical volume, wherein the first step further includes setting each bit of the first difference bitmap corresponding to each unit area of the second logical volume which stores data copied from the first logical volume to a first status to indicate the unit areas of the second logical volume which are copy targets for the second storage system according to the copy request from the host, and wherein the second step further includes creating, in the journal volume, the journal for areas in the second logical volume corresponding to the bits set in the first difference bitmap after the data written into the first logical volume is copied to the second logical volume.

6. The backup method according to claim 5, wherein, at the second step, a prescribed control journal is created each time the creation of a journal of all data which was copied to the second logical volume based on one copy request is complete, the created journals are transferred to the second storage system in the order that they were created, and, upon transferring the control journal from the second logical volume to the third logical volume, the control journal is not transferred to the third logical volume if copy based on a subsequent copy request has been started between the second logical volume and the first logical volume.

7. The backup method according to claim 5, wherein the first storage system further comprises:

a second difference bitmap for managing the transferring of data from the first storage system to the third logical volume, wherein, at the first step, each bit corresponding to each unit area of the first logical volume storing copy-target data in the first and second difference bitmap is set to a first status according to the copy request from the host, and the status of the corresponding bit in the first difference bitmap is changed to a second status each time data stored in the unit area of the first logical volume is copied to a corresponding unit area in the second logical volume, and wherein, at the second step, data stored in a unit area among the unit areas in the second logical volume in which the corresponding bit in the first difference bitmap is set to a second status and the corresponding bit in the second difference bitmap is set to a first status is transferred to the second storage system, and the status of the bit corresponding to the unit area of the second difference bitmap is changed to the second status.

8. The backup method according to claim 5, wherein the host designates a pair status of the first and second logical volumes after the copy is complete in the copy request, and wherein, at the first step, the pair status of the first and second logical volumes is changed to the pair status designated in the copy request after the copy between the first and second logical volumes is complete.

* * * * *